United States Patent [19]

Zadoo

[11] 3,792,713
[45] Feb. 19, 1974

[54] PRESSURE REGULATOR WITH FLOW LIMITER

[75] Inventor: Vijay K. Zadoo, Mt. Prospect, Ill.

[73] Assignee: Vapor Corporation, Chicago, Ill.

[22] Filed: May 21, 1973

[21] Appl. No.: 362,458

[52] U.S. Cl............... 137/486, 137/220, 137/489.5
[51] Int. Cl........................................... F16k 31/363
[58] Field of Search 137/220, 221, 222, 486, 489.5, 137/492.5

[56] References Cited
UNITED STATES PATENTS

| | | | |
|---|---|---|---|
| 1,987,819 | 1/1935 | Foulds | 137/220 X |
| 2,044,437 | 6/1936 | MacPherson | 137/220 |
| 2,922,431 | 1/1960 | Jensen | 137/486 X |

*Primary Examiner*—Alan Cohan
*Assistant Examiner*—Gerald A. Michalsky
*Attorney, Agent, or Firm*—Lloyd L. Zickert

[57] ABSTRACT

An inline fluid flow control valve having a pressure regulating means for modulating the valve position to maintain a relatively constant output pressure and a fluid flow limiting means for overriding the pressure regulating means in the event of loss of downstream pressurization to limit the fluid flow through the valve to a nominal value.

6 Claims, 3 Drawing Figures

PRESSURE REGULATOR WITH FLOW LIMITER

This invention relates in general to an inline pressure regulating valve having a flow limiting means and more particularly to a fluid flow valve for maintaining pressurization in a tank of liquid and especially a fuel tank utilized in aircraft.

The fluid pressure regulating valve of the present invention is especially useful for maintaining pressurization in an external fuel tank for an aircraft by controlling the feed of engine bleed air. Heretofore pressure regulators sensing the loss of downstream pressure, such as could happen where a fighter aircraft sustains combat damage to an external fuel tank or the pressurization ducts to the tank, will go wide open. When this happens, engine bleed air is wasted which consequently affects thrust and range.

The valve of the invention with its flow limiting device, when detecting loss of downstream pressurization, overrides the normal pressure regulating function to limit the fluid flow through the valve to some nominal value thereby conserving engine bleed air and the aircraft's mission capability and survivability.

Moreover, previous aircraft systems have utilized pressure regulating valves with upstream venturi devices to choke and limit the flow through the valve should damage occur to the ducting downstream of the regulator. However, in such an installation the air flow could rise if the input pressure or engine pressure increased. The valve of the present invention limits air flow over a wide range of input pressure. Moreover, the valve of the present invention incorporates the flow limiting function and the pressure regulating function in one device, thereby saving cost and waste.

It is therefore an object of the present invention to provide a new and improved pressure regulator valve having a flow limiting device for reducing flow therethrough to a nominal level in the event of loss of downstream pressurization.

Another object of the present invention is in the provision of a pressure regulating valve including a flow limiting device operable by a venturi arranged at the outlet of the valve and which limits flow over a wide range of input pressure.

A still further object of the invention resides in the provision of a pressure regulating valve having a flow limiting function incorporated in the device with a pressure regulating function, thereby saving cost and waste.

Other objects, features and advantages of the invention will be apparent from the following detailed disclosure, taken in conjunction with the accompanying sheet of drawings, wherein like reference numerals refer to like parts, in which.

Figure 1:
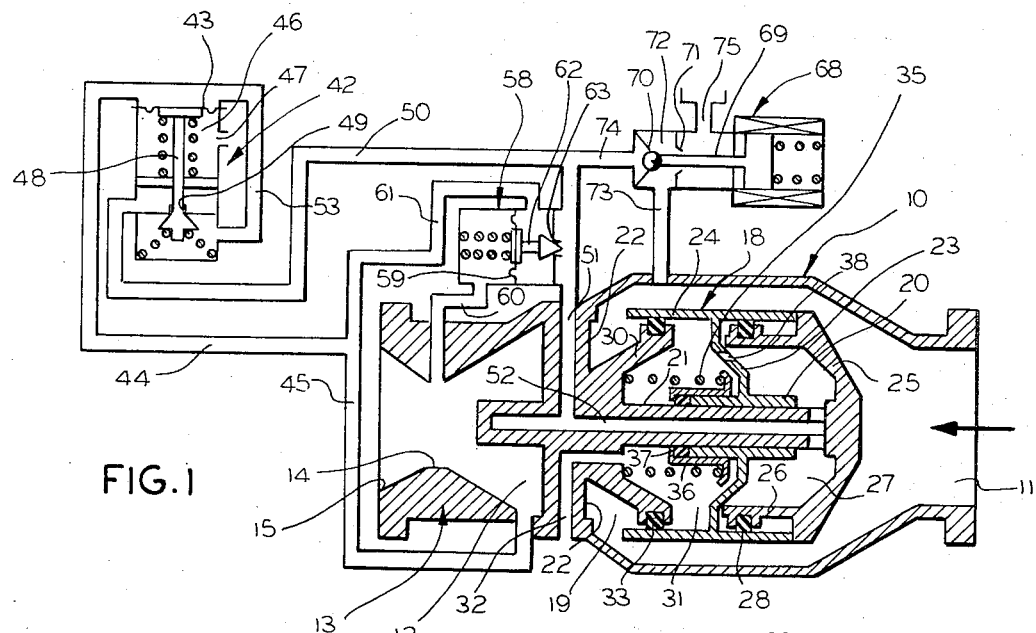
FIG. 1 is a diagrammatic view with some parts in cross-section illustrating the valve according to the present invention and showing the throttling member in open position.

The pressure regulator and flow limiting device of the present invention constitutes a single unit which combines the functions of regulating pressure and limiting flow where it is desired to regulate the pressure at a particular point over a wide range of input pressure and to limit the fluid flow in the event of loss of downstream pressurization. As already mentioned, the valve of the present invention is especially useful for maintaining pressurization in outside fuel tanks for aircraft, while at the same time enabling the functioning of limiting air flow in the event that pressurization in the fuel tank may be lost due to damage of same. However, it should be appreciated that the valve of the invention could be used in any installation where it is desired to maintain a regulated pressure in a container or the like where the source of pressure varies and it is also necessary or preferably to prevent the valve from going wide open in the event of loss of pressurization downstream.

The regulator illustrated in the drawings is a normally open pneumatically operated and solenoid piloted sleeve type pressure regulator and flow limiting valve. The valve includes a valve body 10 which is tubular in form and includes an inlet 11, an outlet 12 and a venturi 13, all of which are in axial alignment. The outlet 12 also functions as the mouth of the venturi which includes a throat 14 and downstream therefrom an outlet 15. Inasmuch as the venturi is integral with the valve body 10, the outlet of the valve is at 15 which in a sense is the outlet of the venturi 13.

A movable throttling member 18 coacts with an opening 19 to control fluid flow through the valve. The throttling member includes a cylindrical hub 20 slidably mounted on an axially extending guide rod 21 which is supported by the outer shell of the valve body by arms 22. A pressure responsive actuator 23 in the general form of a radial disc extends from the hub 20 to the throttling sleeve 24. At the end of the guide rod 21 adjacent the inlet 11, an end wall 25 coacts with the actuator 23 and a cylindrical side wall 26 to define a pressure control chamber 27. It is the pressure within the control chamber 27 that principally determines the position of the throttling member 18. A suitable sealing ring 28 is mounted on the side wall 26 to coact with the throttling sleeve 24 and inhibit the loss of air between the side wall 26 and the sleeve.

An end wall 30 extends from the guide rod 21 and in opposed relation to the end wall 25 to coact with the actuator 23 and the sleeve and define a chamber 31 which is at all times in communication with the ambient pressure through passageway 32. A seal ring 33 is mounted on the periphery of the end wall 30 to coact with the sleeve 24 and prevent loss of air from the valve directly to ambient.

A throttling sleeve return spring 35 is bottomed at one end on the end wall 30 and at the other end on a collar 36 which transmits the spring force to the hub 20 and the throttling member. A seal or gasket 37 prevents the loss of air along the guide rod 21. A bleed hole or orifice 38 is provided in the actuator 23.

A pressure regulating pilot valve 42 modulates the sleeve position to control the output of the valve and maintain a constant output pressure. The valve includes a diaphragm 43, one side of which communicates with the dowmstream pressure of the valve or the pressure at the mouth of the venturi through passageways 44 and 45. The other side of the diaphragm is in communication with a chamber 46 that is vented to ambient by vent 47. A spring biased valve member 48 coacts with a port 49 that communicates between the pressure control chamber 27 by passageways 50, 51 and 52 and the downstream pressure at the mouth of the venturi to passageways 53, 44 and 45.

A flow limiting pilot valve 58 which provides the flow limiting function of the valve includes a diaphragm 59 communicating on one side with the throat 14 of the venturi through passageway 60 and on the other side to the downstream pressure at the mouth of the venturi through passageways 61 and 45. A spring biased valve member 62 is connected to the diaphragm 59 and coacts with a port 63 which on one side is in common with the side of the diaphragm that communicates with the downstream pressure at the mouth of the venturi and at the other side communicates with the pressure control chamber 27 through the passageways 51 and 52.

Figure 2:
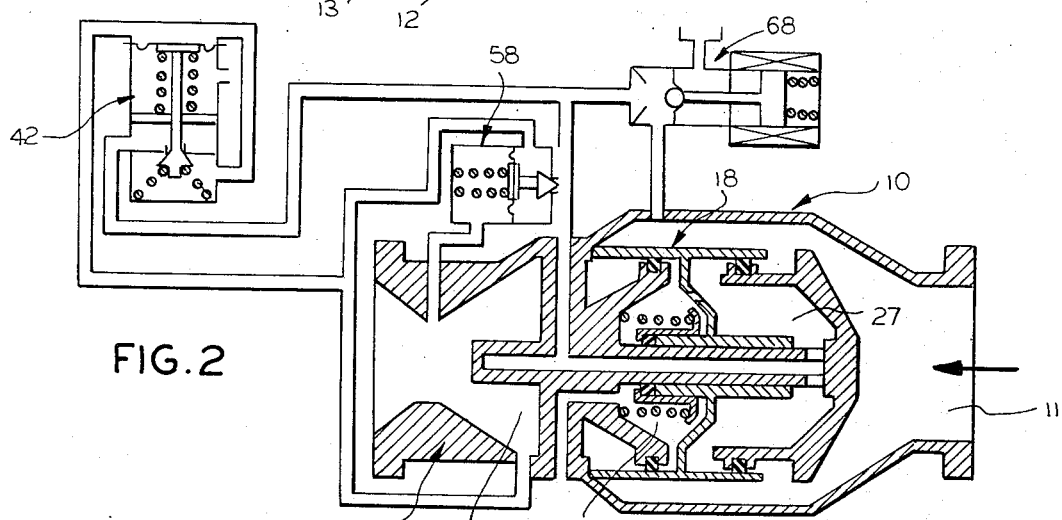
FIG. 2 is a view similar to FIG. 1 but showing the throttling member in closed position.

A shut-off valve 68 includes a solenoid operated valve member 69 coacting with valve seats 70 and 71. A chamber 72 is defined between the valve seats 70 and 71 and which communicates with the upstream pressure of the valve through passageway 73. Accordingly, the seat 70 communicates on one side with upstream pressure and the other side through passageways 74, 51 and 52 with the pressure control chamber 27. The seat 71 communicates on one side with the upstream pressure and on the other side with another device through a bleed port 75. The shut-off valve 68, while illustrated to be solenoid operated, may be operated pneumatically or hydraulically or by any other device. When the solenoid operated shutoff valve 68 is de-energized as shown in FIG. 1, the valve member 69 closes the seat 70, thereby intercommunicating the bleed port 75 with the upstream pressure and preventing intercommunication between the pressure control chamber 27 and the ambient, thereby causing the pressure control chamber to be subjected to the pressure regulating function of the pressure regulating valve 42 or the flow limiting function of the flow limiting pilot valve 58. Energization of the solenoid operated shut-off valve 68 opens the seat 70 and closes the seat 71, thereby applying the upstream pressure to the pressure control chamber 27 as shown in FIG. 2 which will overcome the force of the return spring 35 and close the throttling sleeve 24. Again, when the solenoid operated shut-off valve 68 is de-energized, the flow valve is turned on to resume its flow regulating and limiting functions.

The pressure regulating function can best be understood by referring to FIG. 1 wherein the solenoid operated shut-off valve is de-energized and the movable throttling member 18 is spring loaded to open position. The position of the throttling sleeve 24 is determined by the pressure in the pressure control chamber 27 and dictated by either the pressure regulating valve 42 or the flow limiting valve 58. Assuming the downstream pressurization is intact, that is, no damage has been caused to the downstream ducting and the tank being pressurized, the pressure regulating valve 42 will control the pressurization and ultimately the fluid flow through the valve. The chamber 31 is always vented to atmosphere, while the chambers 27 and 31 are pneumatically connected by the bleed hole 38. The pressure regulating valve 42 responds to the pressure downstream of the throttling sleeve at the outlet 12 which is also at the mouth of the venturi 13. This downstream pressure acts on the diaphragm 43 connected to the spring biased valve member 48 and which pressure is opposed by the spring force and can be adjusted to provide the required regulated pressure in the downstream ducting or tank at the set point of the pressure regulating pilot valve. Should the downstream pressure drop below the set point, the spring force in the pressure regulating pilot valve will exceed the downstream pressure force acting on the diaphragm and will close the pressure regulating pilot valve. The air in the pressure control chamber 27 will bleed through the orifice 38 and thereby to atmosphere, thus reducing pressure in chamber 27 and moving the sleeve 24 to a more open position. In the event of a rise in downstream pressure, the pressure force on the diaphragm 43 of the pressure regulating pilot valve will exceed the spring force and open the valve member 48 to increase the pressure in chamber 27, inasmuch as the area of the port 49 is much greater than the bleed orifice 38 thereby causing the valve sleeve 24 to move toward a more closed position. Accordingly, the pressure regulating pilot valve utilizes downstream static pressure to modulate the position of the throttling sleeve 24. It can be appreciated that when the pressure regulating function is being maintained, full duct pressure will be available at the bleed port 75 of the shut-off valve 68 to provide a signal for other devices in the aircraft system.

Figure 3:
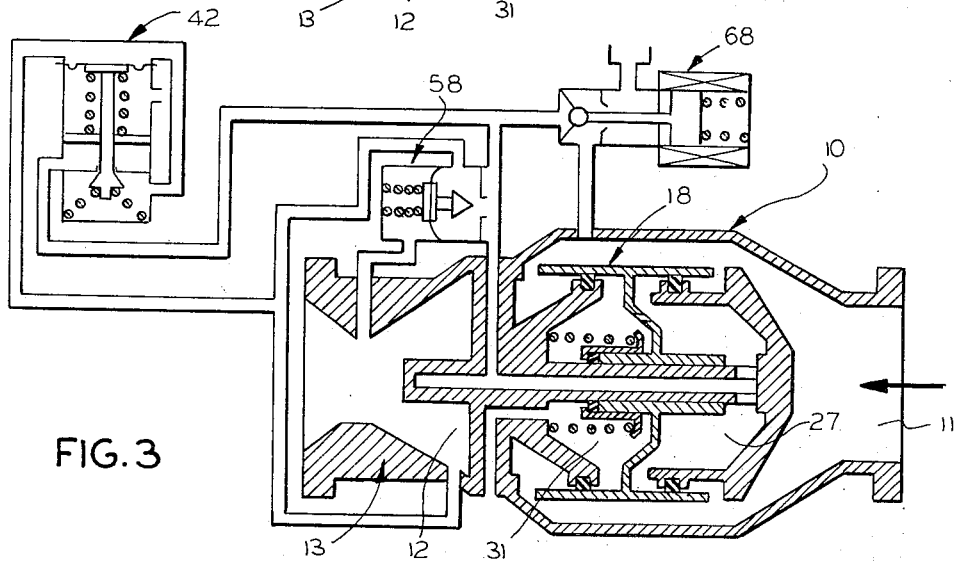
FIG. 3 is a view similar to FIGS. 1 and 2 but showing the throttling member in an intermediate position and the flow limiting device operable to by-pass the action of the pressure regulator.

Should the downstream pressure be lost, such as by damage to the downstream ducting or the tank being pressurized, the pressure limiting valve 58, normally maintained in closed position as shown in FIGS. 1 and 2 by the pressure at the throat of the venturi and the spring forces on the valve member 62, will open. As the air flow increases due to the loss of downstream pressure, the differential between the pressures at the mouth and the throat of the venturi will increase since the pressure at the throat will drop. When the pressure at the throat of the venturi 13 drops sufficiently, the downstream pressure or pressure at the mouth of the venturi acting on the diaphragm 59 will overcome the spring force and pressure force due to the throat of the venturi opening the valve member 62 thereby connecting downstream pressure, as seen in FIG. 3, to the pressure control chamber 27 to cause movement of the throttling member 18 toward closed position to reduce the flow area through the valve. Essentially, the flow limiting pilot valve 58 when opening as shown in FIG. 3 will override or by-pass the function of the pressure regulating pilot valve 42. When the flow through the valve reaches a value less than the flow limit of the pilot valve 58, the pilot valve will close again and the regulator will function in the normal manner. The normal regulating pressure differential across the venturi and the flow limiting differential are spread apart, thereby preventing the flow limiting pilot valve from interfering or overriding the pressure regulating function under normal conditions.

It can be appreciated that the pressure regulating pilot valve 42 and the flow limiting pilot valve 58 can be operated by an evacuated bellows, thereby becoming absolute pressure pilot valves.

It will be understood that modifications and variations may be effected without departing from the scope of the novel concepts of the present invention, but it is understood that this application is to be limited only by the scope of the appended claims.

The invention is hereby claimed as follows:

1. In a fluid pressure regulating valve connected to a supply of variable pressure for regulating the pressure to a tank including a valve body having an inlet and an outlet axially aligned therewith, a venturi at the outlet, means controlling fluid flow through the valve body defined by a movable throttling member coacting with an opening, a pressure responsive actuator connected to said throttling member and communicating with a pressure control chamber on one side and ambient pressure on the other side, spring means continually applying a biasing force against the actuator to move the throttling member toward open position with respect to said opening, a bleed hole in said pressure responsive actuator intercommunicating both sides thereof, a pressure regulating pilot valve controlling the position of the throttling member in response to the pressure downstream of the opening and at the mouth of the venturi, said pilot valve including a diaphragm communicating on one side with said downstream pressure and on the other side with anbient ambient a spring biased valve member connected to said diaphragm and coacting with a port communicating between said downstream pressure and said control chamber to control fluid flow through the port, the improvement in a flow limiting pilot valve including a diaphragm communicating at one side with the pressure at the venturi throat and at the other side with said downstream pressure, a spring biased valve member connected to said diaphragm of said flow limiting pilot valve and coacting with a port communicating between said pressure downstream of said opening and said control chamber to control fluid flow through the port, whereby a loss of pressure in the tank causes actuation of said flow limiting valve to open same and bypass said pressure regulating pilot valve and cause movement of said throttling member toward closed position to reduce the fluid flow through the valve.

2. The combination as defined in claim 1, wherein the venturi is integral with the valve body.

3. The combination as defined in claim 1, and a control valve for selectively opening and closing said pressure regulating valve including means for selectively connecting the pressure upstream from said opening to a pressure bleed port or to said control chamber.

4. The combination as defined in claim 3, wherein said control valve is solenoid operated.

5. In a fluid pressure regulating valve connected to a supply of variable pressure for regulating the pressure to a tank including a valve body having an inlet and an outlet axially aligned therewith, a venturi at the outlet, means controlling fluid flow through the valve body defined by a movable throttling member coacting with an opening, a pressure responsive actuator connected to said throttling member and communicating with a pressure control chamber on one side and ambient pressure on the other side, spring means continually applying a biasing force against the actuator to move the throttling member toward open position with respect to said opening, a bleed hole in said pressure responsive actuator intercommunicating both sides thereof, a pressure regulating pilot valve controlling the position of the throttling member in response to the pressure downstream of the opening and at the mouth of the venturi, the improvement in a flow limiting pilot valve including a diaphragm communicating at one side with the pressure at the venturi throat and at the other side with said downstream pressure, a spring biased valve member connected to said diaphragm of said flow limiting pilot valve and coacting with a port communicating between said pressure downstream of said opening and said control chamber to control fluid flow through the port, whereby a loss of pressure in the tank causes actuation of said flow limiting valve to open same and bypass said pressure regulating pilot valve and cause movement of said throttling member toward closed position to reduce the fluid flow through the valve.

6. A pressure regulating and flow limiting inline valve comprising a valve body having an inlet and an outlet axially aligned therewith, a venturi at the outlet, means controlling fluid flow through the valve body including a pressure responsive throttling member coacting with an opening, a pressure regulating pilot valve controlling the position of the throttling member in response to the pressure downstream of the opening and at the mouth of the venturi to maintain a substantially constant outlet pressure, and a flow limiting pilot valve bypassing said pressure regulating pilot valve and responding to the pressure differential between the mouth and throat of the venturi to cause the throttling member to move toward closed position and reduce the flow through the valve in the event of a loss of pressure downstream of the valve.

* * * * *